United States Patent [19]

Bainard

[11] 4,049,281
[45] Sept. 20, 1977

[54] UNITIZED DUAL LIP SEAL METHOD

[75] Inventor: Dean R. Bainard, Clover, S.C.

[73] Assignee: Garlock Inc., Rochester, N.Y.

[21] Appl. No.: 652,901

[22] Filed: Jan. 28, 1976

Related U.S. Application Data

[62] Division of Ser. No. 512,205, Oct. 7, 1974, Pat. No. 3,963,248.

[51] Int. Cl.² .............................................. F16J 15/34
[52] U.S. Cl. ......................................... 277/1; 277/37; 277/38
[58] Field of Search ................. 277/1, 37, 65, 82, 165, 277/39, 81 R, 84, 38, 178, 235, 134

[56] References Cited

U.S. PATENT DOCUMENTS

| | | | |
|---|---|---|---|
| 2,245,475 | 6/1941 | Hately | 277/65 |
| 3,021,161 | 2/1962 | Rhoades et al. | 277/37 |
| 3,561,770 | 2/1971 | Corsi et al. | 277/134 |
| 3,606,351 | 9/1971 | Hallerback | 277/82 |

Primary Examiner—Richard E. Aegerter
Assistant Examiner—L. Footland
Attorney, Agent, or Firm—Schovee & Boston

[57] ABSTRACT

A unitized dual lip seal for providing a seal between a housing and a shaft extending through a bore in the housing, including (1) a wear sleeve connected to the housing and having an inwardly extending radial flange, and (2) an elastomeric member mounted on the shaft with a main sealing lip riding on the inner wall of the wear sleeve on one side of the radial flange and an auxiliary lip on the other side of the radial flange and riding on the outside face of the radial flange. The umbrella-like auxiliary lip prevents formation of a pocket of contaminant and also encourages water drainage to wash sludge away from the auxiliary lip.

3 Claims, 2 Drawing Figures

UNITIZED DUAL LIP SEAL METHOD

This is a division of application Ser. No. 512,205, filed Oct. 7, 1974, now U.S. Pat. No. 3,963,248.

BACKGROUND OF THE INVENTION

1. Field of the Invention

This invention relates to seals with auxiliary lips and in particular to a unitized bore-sealing lip seal with an outside face-sealing auxiliary lip.

2. Description of the Prior Art

Sealing devices with auxiliary lips are well known, however, the auxiliary lips of the prior art are not capable of excluding high concentrations of dirt or sludge, because often their design results in the formation of a pocket in which contaminants can collect, between the auxiliary lip and the relatively rotating member in contact therewith.

It is therefore a primary object of this invention to provide a seal with an auxiliary lip that is not subject to the above disadvantages of the prior art. It is another object of this invention to provide a unitized dual lip seal with an umbrella-like auxiliary lip that seals on the outside face of the integral wear sleeve and not only prevents formation of a pocket of contaminant but, due to its shape, encourages water drainage to wash sludge away from the auxiliary lip.

SUMMARY OF THE PRESENT INVENTION

According to the present invention, a unitized dual lip sealing device is provided with an umbrella-like auxiliary lip that seals on the outside radial face of the integral wear sleeve, thus preventing the formation of a pocket of contaminate, while also encouraging water drainage to wash sludge away from the auxiliary lip. In the preferred embodiment, the sealing device is a unitized bore sealing lip seal including a wear sleeve in the housing bore and an elastomeric member on the shaft, the elastomeric member having a main sealing lip extending radially outwardly toward the wear sleeve on one side of the radial flange of the wear sleeve and having an auxiliary sealing lip extending radially outwardly toward the wear sleeve on the other side of the radial flange, and extending into sealing contact with the outside radial surface of the radial flange of the wear sleeve.

In another embodiment, the wear sleeve mounts against the housing in the area surrounding the bore, rather than being a press fit in the bore.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DETAILED DESCRIPTION OF THE PREFERRED EMBODIMENTS

Figure 1:
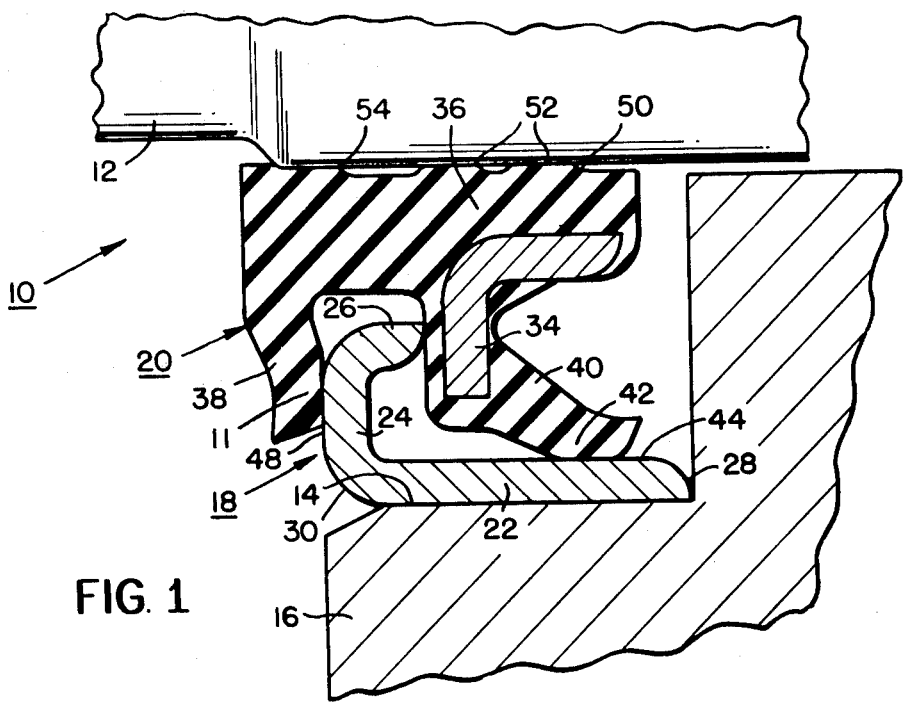
FIG. 1 is a fragmentary partial cross-sectional view through a preferred embodiment of the sealing device of the present invention, shown installed between a housing bore and a shaft extending therethrough.

Referring now to the drawings, FIG. 1 shows a unitized, bore-sealing lip seal 10 having a face-sealing auxiliary lip 11 according to a preferred embodiment of the present invention. The seal 10 is used between a shaft 12 and a bore 14 of a housing 16. The seal 10 includes an outer annular metal wear sleeve 18 and an inner annular elastomeric member 20.

The wear sleeve 18 includes a cylindrical wall 22, a radial flange 24, and a cylindrical flange 26. The cylindrical wall 22 is a press fit in the bore 14 and has an axially inner end 28 toward the oil side of the housing 16 and an axially outer end 30 toward the air side (or outside) of the housing 16. The radial flange 24 extends radially inwardly from the outer end 30 of the cylindrical wall 22 and terminates in the axially inwardly extending cylindrical flange 26.

The inner elastomeric member 20 (preferably of molded rubber) includes a metal reinforcing element 34. The member 20 includes a cylindrical portion 36, an auxiliary radial portion 38, and a main radial portion 40. The radial portions 38 and 40 extend radially outwardly from the cylindrical portion 36 on opposite sides of the radial flange 24. The radial portion 40 includes a main sealing lip 42 that rides on the radially inner wall surface 44 of the cylindrical wall 22 of the wear sleeve 18. The radial portion 38 includes the auxiliary lip 11 that rides on the outer surface or face 48 of the radial flange 24 of the wear sleeve 18.

The inner surface 50 of the inner body member 20 has annular ridges 52 thereon designed to allow easy installation of the shaft 12, and a deflectable portion 54 designed to urge the auxiliary lip 11 against the flange 24 of the wear sleeve 18.

The seal 10 described above is unitized with the elastomeric member 20 being loosely held to the wear sleeve 18 by virtue of the radial flange 24 being positioned in-between the two radial portions 38 and 40. The seal 10 is assembled by pushing the wear sleeve 18 toward the elastomeric member 20 over the umbrella-like auxiliary lip 11.

The flange 26 assures proper axial relationship between the various parts of the seal 10, so that the auxiliary lip 11 will be in sealing contact with the radial flange 24.

The seal 10 is pressed into the bore 14 and then the shaft 12 is inserted through the seal 10 from the oil side of the housing 16. The seal of the present invention can be applied with slight modification to such diverse applications as transmission control lever shafts and trailer hub seals, for example.

Figure 2:
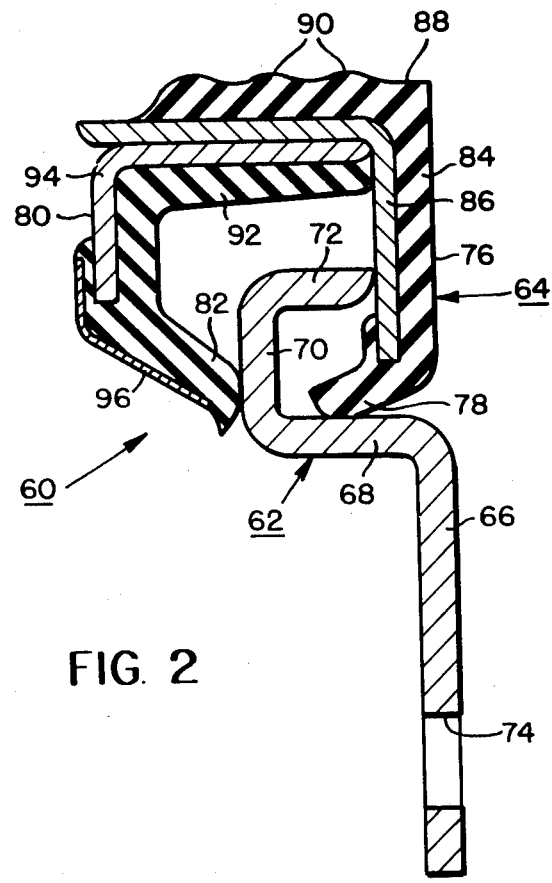
FIG. 2 is a partial cross-sectional view through another embodiment of the present invention.

FIG. 2 shows a seal 60 according to another embodiment of the present invention. The seal 60 has application for example on tractors for sealing the shafts of the track rollers or idler wheels. The seal 60 includes a wear sleeve 62 and an elastomeric member 64. The wear sleeve 62 includes a radial attachment flange 66, a cylindrical wall 68, a radial wear flange 70 and a cylindrical flange 72. The attachment flange 66 can be attached to housing (not shown), with a gasket (not shown) therebetween, for example, by means of bolts extending through bolt holes 74. The remaining portions 68, 70 and 72 of the wear sleeve 62 are similar to portions 22, 24 and 26 of the seal 10 of FIG. 1.

The elastomeric member 64 is made in two parts, a main part 76 supporting a main sealing lip 78 and an auxiliary part 80 supporting an auxiliary sealing lip 82. The main part 76 includes an elastomeric body 84 (preferably of molded rubber) bonded to a metal reinforcing element 86. The radially inner cylindrical surface 88 of the body 84 is provided with a plurality of annular ridges 90 designed to allow easy installation of a shaft (not shown).

The auxiliary part 80 includes an elastomeric body 92 (preferably of molded rubber) bonded to a reinforcing element 94. The element 94 is a press fit within the element 86. The auxiliary part 80 also includes a finger spring 96 bonded to the auxiliary lip 82 for urging it into sealing contact with the outside radial face of the radial wear flange 70. The finger spring 96 is a standard type of finger spring including, as is well-known in the art, a plurality of spaced-apart spring fingers.

The seal 60 is assembled by placing the main part 76 against the flange 72 of the wear sleeve 62 as shown in FIG. 2, and then press-fitting the auxiliary part 80 onto the main part 76, thus forming the unitized seal 60. Various known retainer means can be used to hold the two parts 76 and 80 together after assembly, if desired. When inserted in place, the flange 72 assures proper axial relationship of all parts and that the auxiliary lip 82 is in sealing contact with the radial wear flange 70.

For use in the present specification and claims, the term "inside" means axially toward the oil side of the housing bore and "outside" means the air side thereof. By contrast, the inside surface 50 of the elastomeric member 20, for example, will be referred to as the "radially inner" surface.

It is to be understood that the present invention is not limited to the preferred embodiments described above; variations and modifications therein can be made as will be evident to one skilled in the art. For example, it is not necessary to have the elastomeric member on the shaft and the wear sleeve on the housing, but rather the wear sleeve can be on the shaft and the elastomeric member can be connected to the housing. Further, the main sealing lip can contact the wear sleeve at other locations than as shown and can be of completely different design and shape. The reinforcing elements can be omitted if desired, and if desired, can be replaced by equivalent structures.

While it is not essential that the seal of this invention be unitized, such is preferred and is easily accomplished since the distal end of the radial flange of the wear sleeve is closer to the main body of the elastomeric member than are the distal ends of the two sealing lips.

The invention has been described in detail with particular reference to the preferred embodiments thereof, but it will be understood that variations and modifications can be effected within the spirit and scope of the invention as described hereinabove and as defined in the appended claims.

I claim:

1. A method for sealing the space between a housing bore and a shaft extending therethrough comprising positioning a wear sleeve onto one of said bore and shaft with said sleeve having a radial flange extending toward the other of said bore and shaft and having a cylindrical flange connected to the distal end of said radial flange, positioning an elastomeric member on the other of said bore and shaft, said member having an auxiliary radial portion including an auxiliary sealing lip extending radially toward the wear sleeve on one side of said flange and a main radial portion including a main sealing lip extending radially toward said wear sleeve on the other side of said flange, positioning said auxiliary sealing lip into contact with the outside radial surface of said flange, whereby a pocket for contaminate does not form and whereby water drainage is encouraged to wash sludge away from the auxiliary sealing lip, and positioning the distal end of said cylindrical flange in contact with said main radial portion when said auxiliary sealing lip is in contact with the outside radial surface of said radial flange, whereby said cylindrical flange ensures that said auxiliary sealing lip will always be in contact with said outside radial surface of said radial flange.

2. The method according to claim 1 including providing said annular wear sleeve with a cylindrical portion connected to the proximal end of said radial flange and including positioning said main sealing lip in contact with a radially inner surface of said cylindrical portion of said wear sleeve.

3. The method according to claim 1 including biasing said auxiliary sealing lip into contact with said outside radial surface of said flange.

* * * * *